(12) United States Patent
Chow et al.

(10) Patent No.: US 7,003,333 B2
(45) Date of Patent: Feb. 21, 2006

(54) LATCH MECHANISM AND ELECTRONIC DEVICE EMPLOYING A LATCH MECHANISM

(75) Inventors: Tatt Hoong Chow, Singapore (SG); Huan Seng Chia, Singapore (SG); Ee Fong Lee, Singapore (SG)

(73) Assignee: Motorola, Inc., Schaumburg, IL (US)

( * ) Notice: Subject to any disclaimer, the term of this patent is extended or adjusted under 35 U.S.C. 154(b) by 430 days.

(21) Appl. No.: 10/244,978

(22) Filed: Sep. 17, 2002

(65) Prior Publication Data

US 2004/0198245 A1 Oct. 7, 2004

(51) Int. Cl.
*H04M 1/00* (2006.01)
(52) U.S. Cl. .............. 455/575.3; 455/575.1; 455/90.3; 379/433.11; 379/433.13
(58) Field of Classification Search ............ 455/575.1, 455/575.3–4, 90.1–3, 347–349; 379/433.01, 379/433.11–13; 16/308, 304, 340, 342, 54, 16/386
See application file for complete search history.

(56) References Cited

U.S. PATENT DOCUMENTS

| | | | |
|---|---|---|---|
| 5,185,790 A * | 2/1993 | Mischneko | 379/433.13 |
| 5,274,882 A | 1/1994 | Persson | |
| 5,657,370 A * | 8/1997 | Tsugane et al. | 455/566 |
| 5,666,694 A * | 9/1997 | Slow et al. | 16/368 |
| 5,689,824 A | 11/1997 | Nagai | |
| 5,706,332 A | 1/1998 | Nagai | |
| 5,956,656 A | 9/1999 | Yamazaki | |
| 6,002,764 A * | 12/1999 | Meyer | 379/433.13 |
| 6,151,486 A | 11/2000 | Holshouser et al. | |
| 6,363,243 B1 | 3/2002 | Persson et al. | |
| 6,374,089 B1 | 4/2002 | Till | |
| 6,754,514 B1 * | 6/2004 | Nakamura | 455/575.3 |
| 6,859,978 B1 * | 3/2005 | Pan | 16/292 |
| 2002/0002759 A1 * | 1/2002 | Kim | 16/308 |

* cited by examiner

*Primary Examiner*—Nick Corsaro
*Assistant Examiner*—Tuan Tran
(74) *Attorney, Agent, or Firm*—Randall S. Vaas

(57) ABSTRACT

A hand held electronic device (50) has a flip cover (52) movable between a latched closed position and an open position, the flip cover (52) being slidable in a closed position along a sliding axis between a latched position and an unlatched position whereby in the unlatched position the flip cover (52) is rotatable between a closed position and an open position about a rotational axis transverse to the sliding axis. The flip cover (52) is securable in a latched closed position and an unlatched open position by frictional engagement between gripping fingers at opposite ends of parallel tracks in which rollers attached to the flip cover hinge shaft are able to travel.

18 Claims, 6 Drawing Sheets

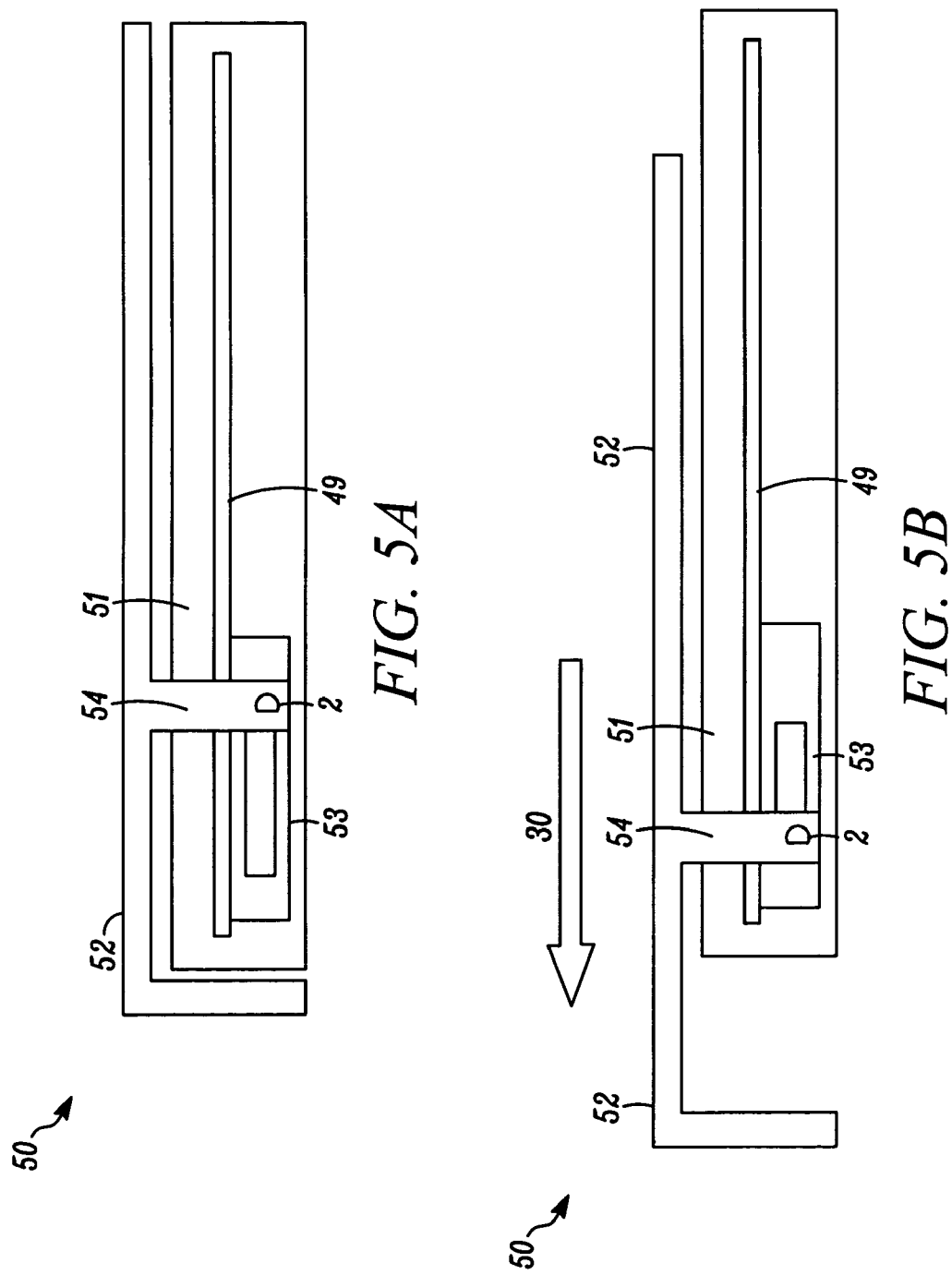

LATCH MECHANISM AND ELECTRONIC DEVICE EMPLOYING A LATCH MECHANISM

FIELD OF THE INVENTION

This invention is concerned with a latch mechanism and electronic device using such a latch mechanism. The invention is concerned, particularly, although not exclusively with a latch mechanism for a flip cover of a hand held electronic device such as a cell phone.

BACKGROUND OF THE INVENTION

Hand held electronic devices such as personal digital assistants (PDA's) and cell phones have employed hinged covers or lids to provide physical protection for a keypad and/or a touch sensitive liquid crystal display (LCD).

U.S. Pat. No. 5,956,656 discloses a PDA with a hinged cover movable from a closed position to an open position where it remains, inclined slightly to a vertical axis, under the influence of gravity.

As hand held electronic devices, particularly cell phones, have become more compact, it has become commonplace to utilize a foldable lid or flip cover embodying a microphone to maintain an effective spacing between the loudspeaker and microphone of a cell phone to align with the ear and mouth of a user.

For convenience, it is considered desirable that a cell phone be operated in a one handed mode rather than with two hands as with some earlier cell phones which relied upon a stiff or frictional hinge mechanism to maintain the flip in a closed or open position.

U.S. Pat. No. 5,689,824 and U.S. Pat. No. 6,363,243 each describe a cell phone having a flip cover biased to a normally open position by a spring mechanism but otherwise able to be latched into a closed position by a mechanical latching mechanism.

A magnetic latch mechanism having a magnetic attraction force greater than the biasing force of a flip cover opening spring is disclosed in each of U.S. Pat. Nos. 5,706,332 and 6,151,486. The former patent relies upon a spring loaded magnet carrier to move one magnet in a cell phone body out of alignment with a fixed magnet in a cell phone flip until the magnetic closing force is exceeded by the spring biased opening force. The latter patent relies upon a selectively actuated magnetic field generator to reduce the magnetic attraction force between aligned magnets in the cell phone body and the flip cover.

U.S. Pat. No. 5,274,882 describes a cell phone having an axially biased flip hinge mechanism wherein the cell phone flip cover is located in an open or closed position by a socket and spigot engagement mechanism. Opening and closing of the flip cover in this type of cell phone requires a two handed operation.

Another type of flip cover requiring a two handed operation to open and close the flip cover is described in U.S. Pat. No. 6,374,089. This patent describes a damper mechanism in the form of an electric motor associated with the pivotal movement of the flip to provide a sense of resistance in rotation of the flip cover.

While generally satisfactory for their respective intended purposes, such prior art flip cover mechanisms either require a two handed operation or otherwise require expensive and relatively fragile latching mechanisms with protruding latch actuators enabling accidental opening of a flip cover under normal handling conditions. Accordingly, there is a need for a simple, inexpensive and robust latching mechanism for hand held electronic devices, which mechanism may be operated in a one handed operation.

SUMMARY OF THE INVENTION

According to one aspect of the invention there is provided a latch mechanism for a flip cover of a hand held electronic device, said latch mechanism comprising:

a rotatable shaft mounted in spaced slotted apertures of a track member to allow movement of said shaft in a direction transverse to a rotational axis of said shaft;

a latch member mounted on said shaft for relative longitudinal movement along said shaft and relative rotational movement coaxially with said rotational axis, said latch member and said shaft being relatively moveable between a disengaged position in which said shaft is free to rotate relative to said latch member and an engaged position in which rotation between said shaft and said latch member is resisted by engagement between said latch member and a projection extending radially from said shaft; and a coupling that operatively couples said latch member with said track member, said coupling, in use, being operable to move said latch member between an engaged and a disengaged position by movement of said shaft in a direction transverse to said rotational axis.

Preferably, said coupling, in use, is operable to move said latch member between an engaged and a disengaged position by movement of said shaft in a direction orthogonal to said rotational axis.

Suitably, the latch mechanism is incorporated in a body of said electronic device.

Alternatively, the latch mechanism is incorporated in a flip cover of said electronic device.

The track member may be formed integrally with said flip cover or said body.

Preferably, the track member comprises a housing securable to said flip cover or said body.

The shaft may include at least two spaced rollers fixed to said shaft for rotation therewith, said rollers each being located in a respective track on opposite sides of said track member.

If required, the track member may include at least one detent mechanism to releasably retain said shaft against slidable movement therein.

Suitably, the track member includes a detent mechanism adjacent opposite ends of respective slotted apertures.

Suitably, the detent mechanism includes resiliently deformable gripping elements to releasably retain a respective roller.

Preferably said latch member may be restrained against rotation about said shaft by slidable engagement between said latch member and a wall of said track member.

Suitably, the coupling may comprise a projection engaged with the track member whereby relative movement between a ramped surface of the track member and said projection along a length of the ramped surface in the direction transverse to said rotational axis urges said latch member between an engaged and a disengaged position.

The ramped surface may comprise a contoured slotted aperture in a transverse wall of said track member, said slotted aperture locating the projection that depends from said latch member.

If required, said latch mechanism may include a resilient biasing member to urge said latch member to a normally engaged position.

The biasing member may comprise a compression spring.

Alternatively, the biasing member may comprise a torsion spring secured between said shaft and said latch member.

Preferably, in use, said torsion spring has a preload torque to urge said shaft towards an engaged position with said latch member.

According to another aspect of the invention there is provided a hand held electronic device having a flip cover movable between a latched closed position and an open position, said flip cover being slidable in a closed position along a sliding axis between a latched position and an unlatched position whereby in said unlatched position, said flip cover is rotatable between a closed position and an open position about a rotational axis transverse to said sliding axis.

Preferably, said rotational axis is orthogonal to said sliding axis.

Suitably, said device includes a latch mechanism including:
 a rotatable shaft, rotatable about said rotational axis, mounted in spaced slotted apertures of a track member to allow movement of said shaft in a direction transverse to said rotational axis;
 a latch member mounted on said shaft for relative longitudinal movement along said shaft and relative rotational movement coaxially with said rotational axis, said latch member and said shaft being relatively moveable between a disengaged position in which said shaft is free to rotate relative to said latch member and an engaged position in which rotation between said shaft and said latch member is resisted by engagement between said latch member and a projection extending radially from said shaft; and
 a coupling that operatively couples said latch member with said track member, said coupling, in use, being operable to move said latch member between an engaged and a disengaged position by movement of said shaft in a direction along said sliding axis.

Suitably, the latch mechanism is incorporated in a body of said electronic device.

Alternatively, the latch mechanism is incorporated in a flip cover of said electronic device.

The track member may be formed integrally with said flip cover or said body.

Preferably, the track member comprises a housing securable to said flip cover or said body.

The shaft may include at least two spaced rollers fixed to said shaft for rotation therewith, said rollers each being located in a respective track on opposite sides of said track member.

If required, the track member may include at least one detent mechanism to releasably retain said shaft against slidable movement therein.

Suitably, the track member includes a detent mechanism adjacent opposite ends of respective slotted apertures.

Suitably, the detent mechanism includes resiliently deformable gripping elements to releasably retain a respective roller.

Preferably, said latch member is restrained against rotation about said shaft by slidable engagement between said latch member and a wall of said track member.

Suitably, the coupling may comprise a projection engaged with the track member whereby relative movement between a ramped surface of the track member and said projection along a length of the ramped surface in the direction transverse to said rotational axis urges said latch member between an engaged and a disengaged position.

The ramped surface may comprise a contoured slotted aperture in a transverse wall of said track member, said slotted aperture locating the projection that depends from said latch member.

If required, said latch mechanism may include a resilient biasing member to urge said latch member to a normally engaged position.

The biasing member may comprise a compression spring.

Alternatively, the biasing member may comprise a torsion spring secured between said shaft and said latch member.

Preferably, said torsion spring has a preload torque to urge said shaft towards an engaged position with said latch member.

The torsion spring suitably is adapted to urge said flip cover to a closed latched position.

BRIEF DESCRIPTION OF THE DRAWINGS

In order that the invention may be more readily understood and put into practical effect, reference will now be made to preferred embodiments illustrated in the accompanying drawings in which:

FIGS. 5a to 5c show schematically cross-sectional views of a cell phone with a flip cover moving between a closed, latched state to an unlatched state and thence to an open state.

DETAILED DESCRIPTION OF THE DRAWINGS

Figure 1:
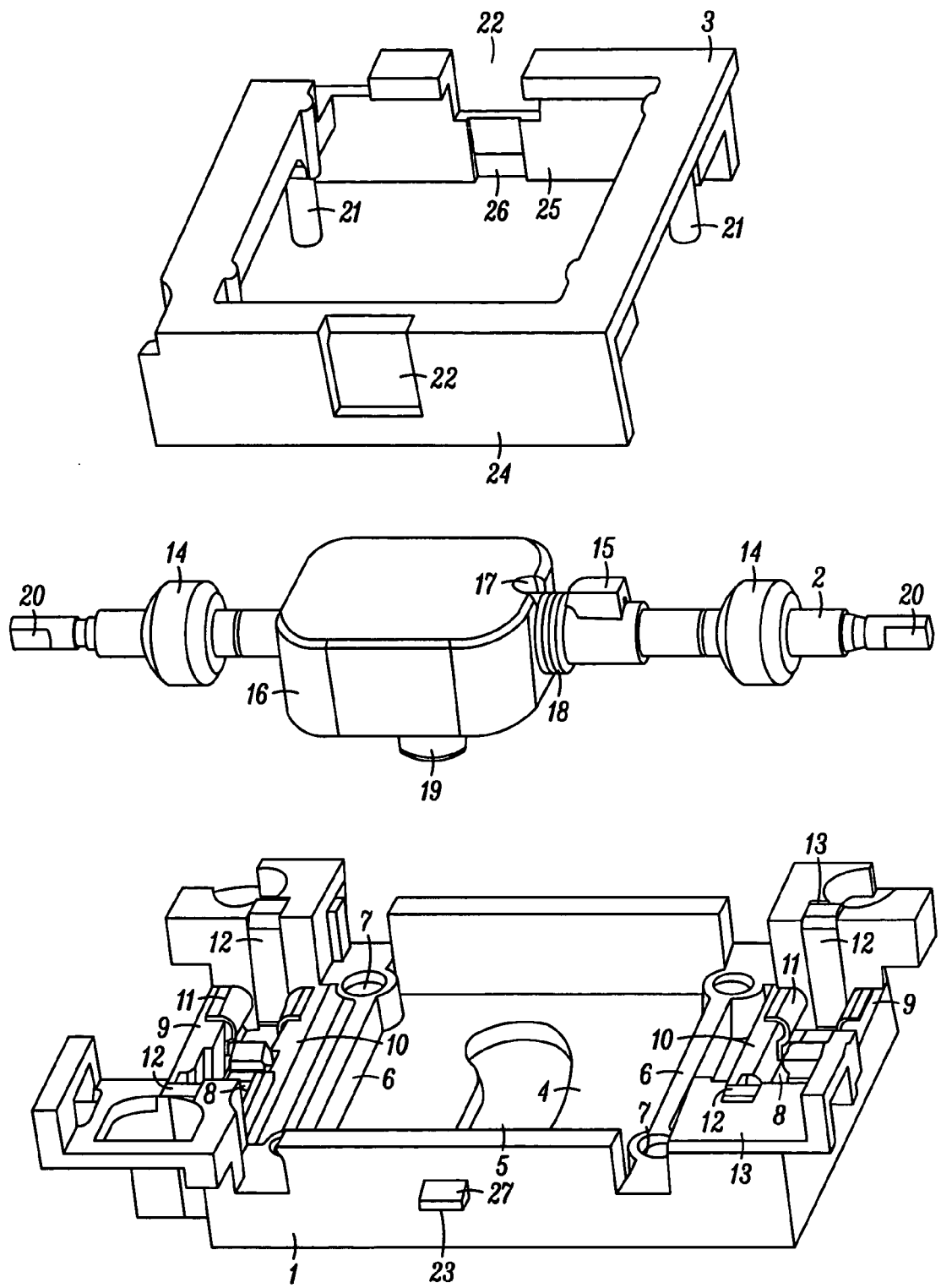
FIG. 1 shows an exploded view of a latch mechanism according to the invention.

In FIG. 1 the latch assembly comprises a housing base in the form of a track member 1, a latchable flip cover hinge pin or rotatable shaft 2 and a housing cover 3.

Track member 1 has a floor 4 with a contoured slotted aperture 5 formed therein and on opposite sides of aperture 5 are a pair of ribs 6 having spaced cover locating recesses 7. Positioned outwards of ribs 6 are recessed tracks 8 formed between spaced walls 9, 10. A resilient metal clip 11 is located at each end of each track 8 by a locating bracket 12 securable in a respective locating recess 13.

The shaft 2 has mounted thereon rollers 14 and a latch key 15 projecting radially and non-rotatably from shaft 2. Slidably mounted between rollers 14 is a hollow latch member 16 having a notched recess 17 to locate key 15 in an engaged position. As shown latch member 16 is disengaged from latch key 15. In an unlatched state as shown, shaft 2 is rotatable in latch member 16 and shaft 2 and latch member 16 are coupled by a torsion spring 18.

Located on the underside of latch member 16 is a boss-like projection 19. Flats 20 formed at the opposite ends of shaft 2 are adapted to engage non-rotatably with a flip cover when mounted on the shaft.

Cover 3 includes cylindrical locating pegs 21 locatable in locating recesses 7 and windowed apertures 22 located in walls 24, 25 allow for securing of the cover 3 to track member 1 when the latch assembly is assembled by engagement with projections 23 of track member 1. A lower portion of walls 24, 25 includes a tapered entry surface 26 complementary to a tapered surface 27 on projections 23 to guide the walls 24,25 resiliently over projections 23 to form a locking engagement therewith.

Figure 2:
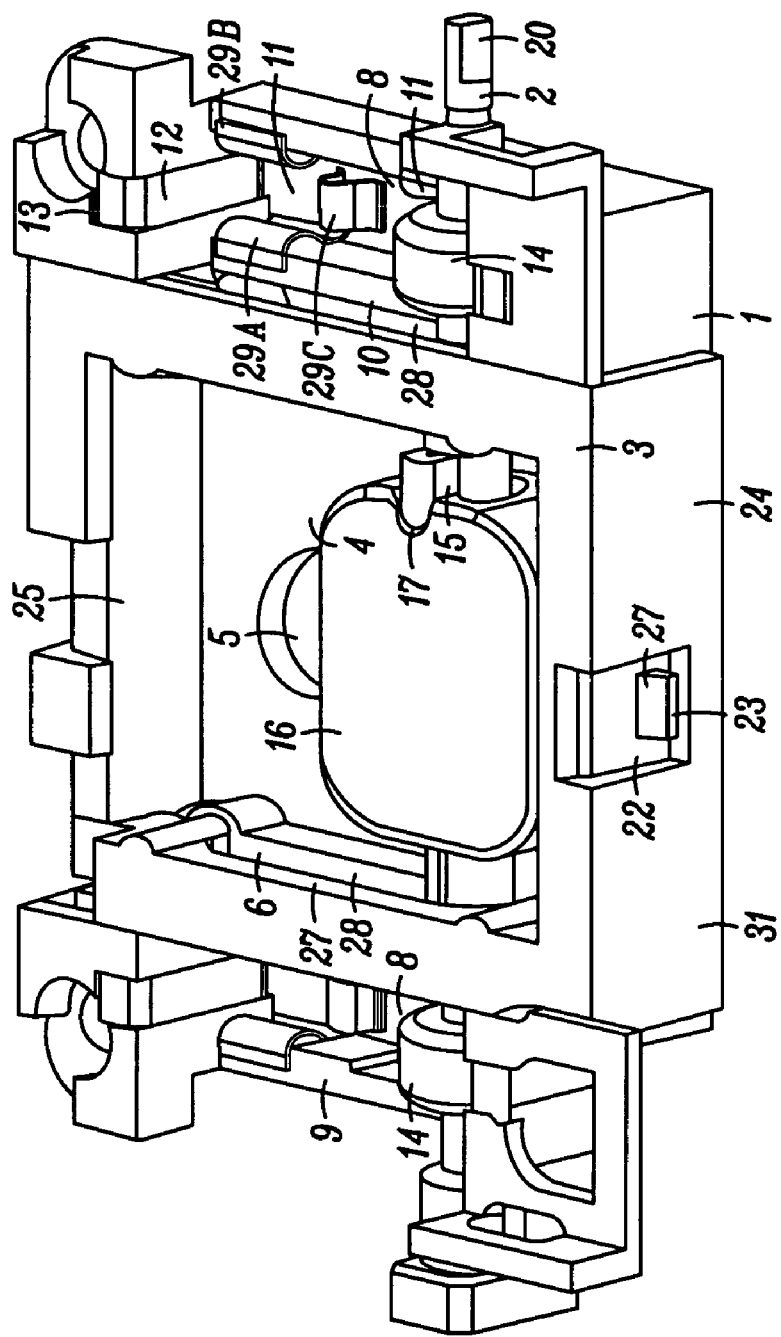
FIG. 2 shows a perspective view of the assembled latch mechanism of FIG. 1 in a latched state.

FIG. 2 shows the assembly of FIG. 1 in an assembled state and for the sake of simplicity, like reference numerals will be employed for like features in FIGS. 2–6 of the accompanying drawings.

As shown, cover 3 is secured over track member 1 by engagement between windows 22 in cover 3 and projections 23 extending from track member 1 to form a housing 31. Rollers 14 are located in tracks 8 and a recessed top wall 27 on each side of cover 3 forms, together with each rib 6, a slotted aperture 28 in which shaft 2 may move slidably along.

Latch member 16 is urged into a latching engagement with shaft 2 by engagement between latch key 15 and notched recess 17 by virtue of the engagement of the projection 19 (shown in FIG. 1) in contoured slotted aperture 5.

Rotation of shaft 2 in the latched state shown in FIG. 2 is prevented by the location of an undersurface of latch member 16 against the floor 4 of track member 1 and by the captive location of shaft 2 in slotted apertures 28.

FIG. 2 shows that in the fully latched position shown, rollers 14 are releasably retained at one end of track 8 by resilient fingers 29a to 29c on clips 11. Also, a coupling is formed by projection 19 (shown in FIG. 1) being engaged with the slotted aperture 5 of the track member 1.

Figure 3:
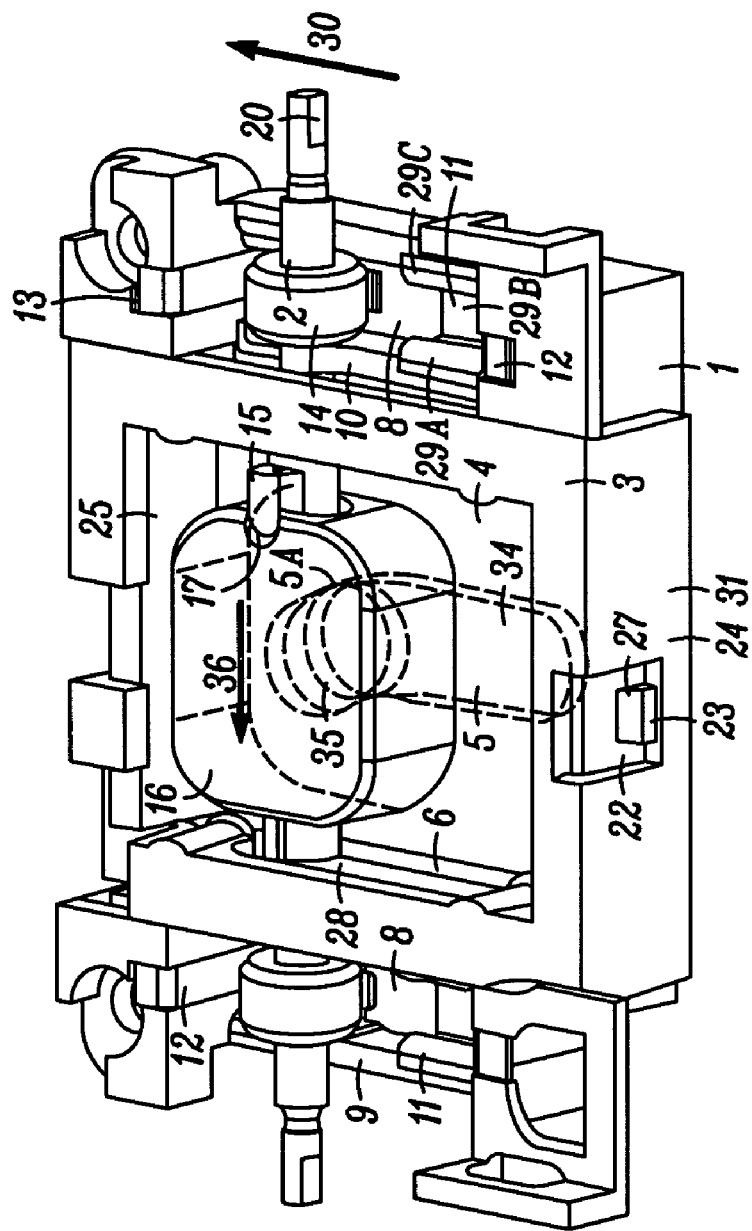
FIG. 3 shows the mechanism of FIG. 2 in a partially unlatched state.

FIG. 3 shows the commencement of disengagement between latch member 16 and shaft 2.

Initially, as shaft 2 moves in the direction shown by arrow 30 that is transverse and typically orthogonal to the rotational axis of shaft 2, rollers 14 are released from the grip of resilient fingers 29a, 29b, and 29c of the rearmost clips 11 in tracks 8 to enable shaft 2 to move freely. During this initial movement, projection 19 (shown in FIG. 1) engaged with the slotted aperture 5, moves slidingly within contoured slotted aperture 5 in a rearward region 34 extending generally parallel to tracks 8 and in this position, retains a latched engagement between latchkey 15 and notched recess 17 of latch member 16.

When projection 19 commences entry into the angularly inclined forward region 35 of slotted aperture 5 (forming a ramped surface), engagement of projection 19 with a ramped surface or side wall portion 5a of aperture 5 starts to move latch member 16 axially in the direction shown by arrow 36 as shaft 2 advances in the direction of arrow 30 and this initiates partial disengagement between latchkey 15 and notched recess 17.

Figure 4:
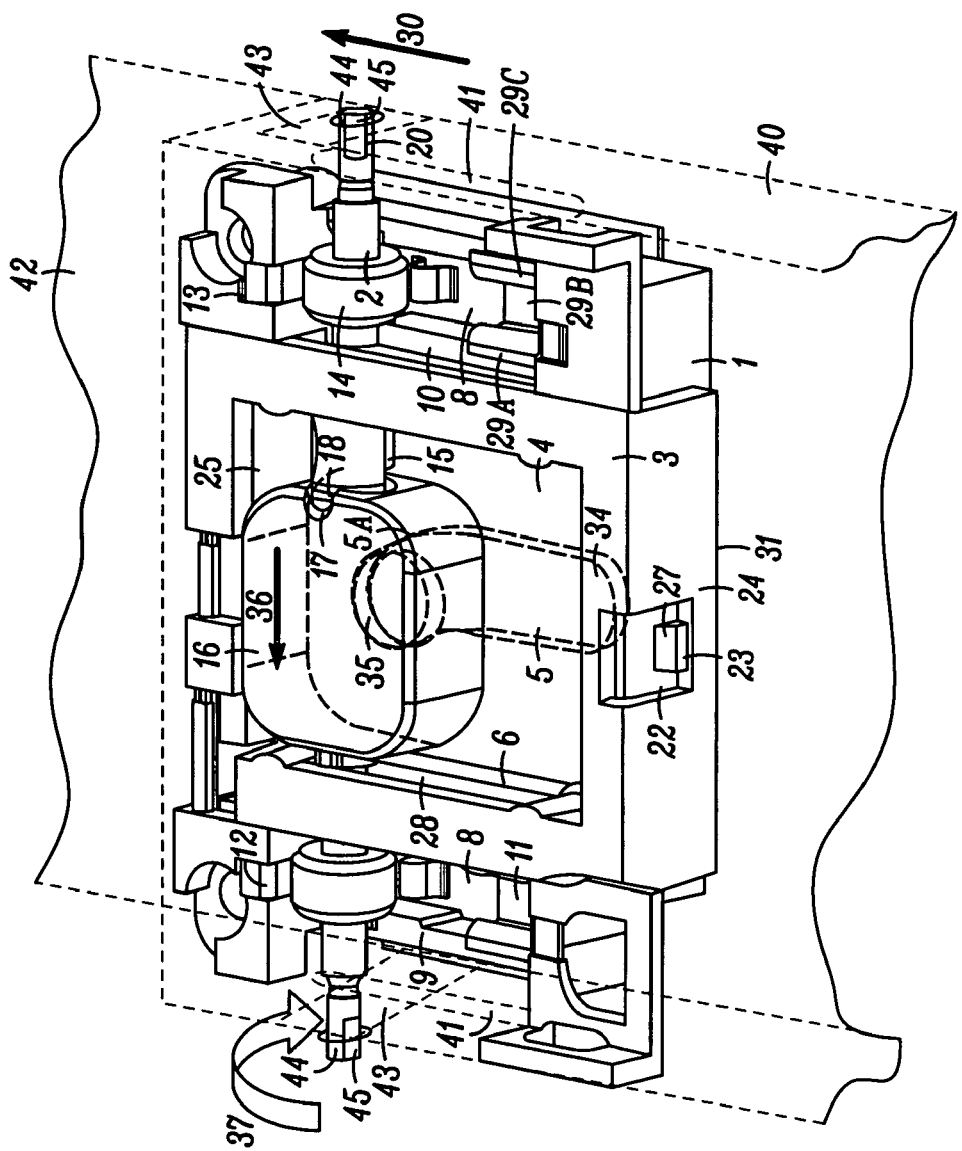
FIG. 4 shows the mechanism of FIGS. 2 and 3 in an unlatched state.

FIG. 4 shows shaft 2 at the fullest extent of travel within the housing 31 with rollers 14 gripped by resilient fingers 29a, 29b, and 29c of rearmost clips 11. In this position latch member 16 has been urged sufficiently in the direction of arrow 36 to disengage latchkey 15 from notched recess 17 to permit shaft 2 to rotate in the direction of arrow 37 against the restoring force of torsion spring 18 thereby urging the latch member 16 from an engaged to a disengaged position. The fully unlatched state (disengaged position), as shown, is insufficient to overcome the gripping force exerted by resilient fingers 29a, 29b, and 29c which restrain shaft 2 in the fully extended position shown thereby preventing rotation of shaft 2 relative to latch member 16.

As shown in partial phantom outline, the latch assembly according to this aspect of the invention is conveniently located within a device housing 40 of a hand held electronic device such as a cell phone. The free ends of shaft 2 extend through slotted apertures 41 in opposed side walls of housing 40 to permit movement of the shaft 2 and roller 4 combination along tracks 8.

A flip cover 42 is mounted on shaft 2 for rotation therewith by mounting flanges 43 having mounting apertures 44 with aperture contours complementary to the cross-sectional contour of the shaft end portions 45.

As will be readily apparent to a person skilled in the art, shaft 2 is able to rotate through about 180° as it becomes unlatched from latching member 16 whereby flip cover 42 may move from an open or extended position as shown to a closed latch position with flip cover 42 overlying an upper portion of device housing 40.

Figure 5C:
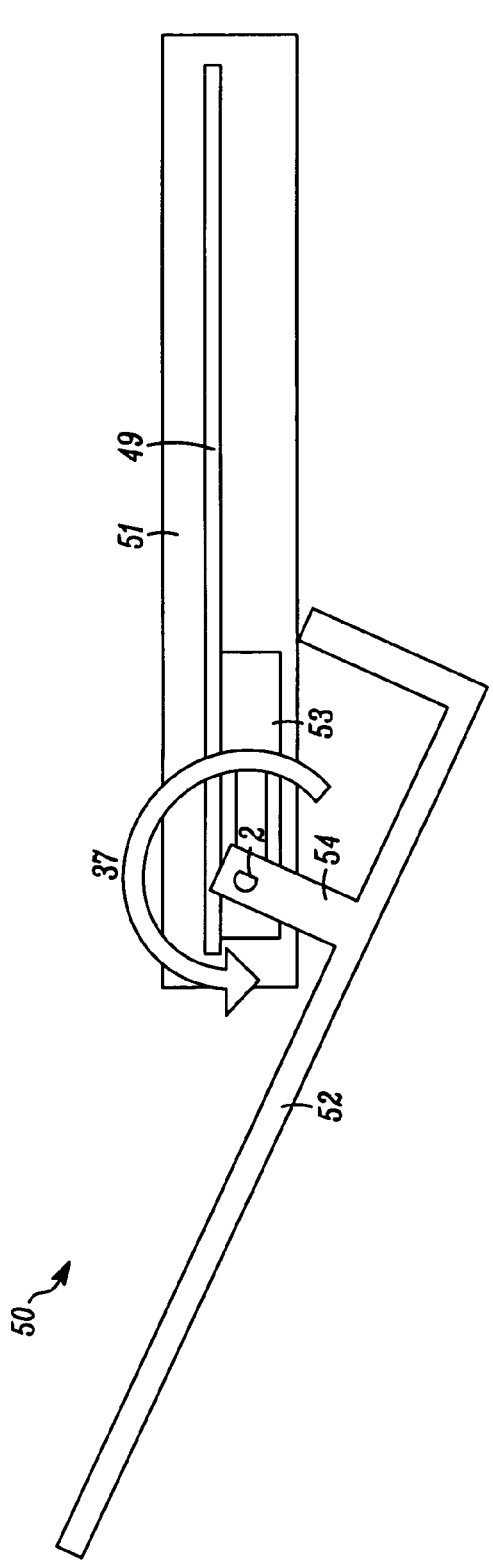

FIGS. 5a to 5c show schematically the operation of one aspect of the invention as applied to a cell phone by reference to cross-sectional views 5a, 5b and 5c, respectively corresponding to the relative juxtaposition of latch assembly elements described in FIGS. 2 to 4 of the accompanying drawings. Again, where appropriate, like reference numerals have been employed for like features for the sake of simplicity.

FIG. 5a shows a hand held electronic device in the form of a cell phone represented schematically by a body housing 51 enclosing a Printed Circuit Board (PCB) 49 and an associated flip cover 52.

Located within housing 51 is a latch mechanism 53 in a normally closed position as shown and wherein the relative juxtaposition of the latch mechanism 53 is illustrated generally as shown in FIG. 2.

Flip cover 52 is pivotally connected to housing 51 via shaft 2 to mounting flanges 54 associated with flip cover 52. As illustrated in FIG. 2, shaft 2, and therefore flip cover 52 is prevented from rotational movement about shaft 2 by virtue of the latched engagement between shaft 2 and the latch member 16 slidably located within latch mechanism 53.

When flip cover 52 is slidingly displaced, along a sliding axis, relative to body 51 in the direction represented by arrow 30 as shown in FIG. 5b, latch member 16 disengages with latchkey 15 on shaft 2 as shown in FIG. 4 whereby flip cover 52 is urged rotate in the direction shown by arrow 37 through about 180° or slightly less as shown under the influence of torsion spring 18 as shown in FIGS. 1 and 4.

Flip cover 52 is conveniently located in a closed, latched position as shown in FIG. 5a by engagement of rollers 14 with rearward resilient fingers 29a, 29b and 29c as shown in FIG. 2. Similarly, flip cover 52 is located in an open latched position as shown in FIG. 5c by engagement of rollers 14 with the resilient fingers 29a, 29b and 29c at the opposite end of track 8 as shown in FIG. 4.

Flip cover 52 may be moved simply from a latched position as shown in FIG. 5a by a simple one handed movement to an unlatched position as shown in FIG. 5b whereupon flip cover 52 becomes free to rotate to the open position as shown in FIG. 5c under the influence of torsion spring 18 as shown in FIGS. 1 and 4. Hence, the coupling is operable to urge said latch member between an engaged and a disengaged position by movement of the shaft 2 in a direction along the sliding axis that is orthogonal to the rotational axis 37 of shaft 2. To close the flip cover 52 and restore the cell phone 50 to the closed, latched state shown in FIG. 1, flip cover 52 is returned to the position as shown in FIG. 5b and a light finger pressure is applied to flip cover 52 to release rollers 14 from clips 11 whereby flip cover 52 moves back to a closed latched position as presented by corresponding FIG. 2.

Figure 6:
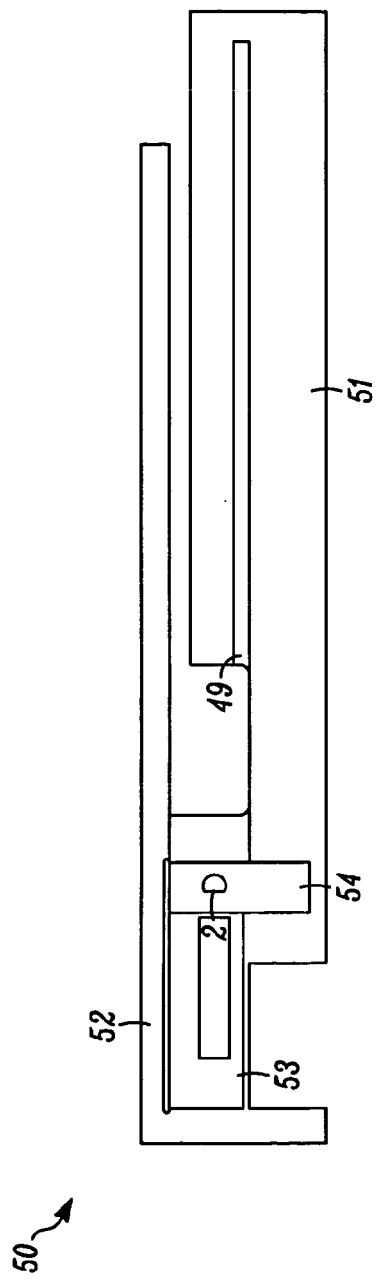
FIG. 6 shows an alternative embodiment of the invention.

FIG. 6 shows yet another embodiment of the invention wherein the latching mechanism 53 according to one aspect of the invention is associated with the flip cover 52 to achieve substantially the same functional abilities of the arrangement shown schematically in FIG. 5 but in a more detailed fashion with reference to FIGS. 2–4 of the accompanying drawings.

It readily will be apparent to a person skilled in the art that many modifications and variations may be made to the various aspects of the invention without departing from the spirit and scope thereof.

Equally it will be apparent that the latch mechanism and hand held electronic devices embodying same in accordance with the invention offer substantial advantages over prior art latch mechanisms.

The latch mechanism according to the invention is simple, robust and requires only a small number of components. Its capacity to be packaged as a unitary assembly in a housing permits rapid and easy assembly of electronic devices having a flip cover.

Apart from being reliable and durable in use, hand held devices embodying the flip cover latch mechanism according to the invention are easy to actuate in a one handed operation and, when latched, are less prone to accidental flip cover opening caused by accidental actuation of a protruding latch actuation button or the like.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

What is claimed is:

1. A latch mechanism for a flip cover of a hand held electronic device, said latch mechanism comprising:
   a rotatable shaft mounted in spaced slotted apertures of a track member to allow movement of said shaft in a direction transverse to a rotational axis of said shaft;
   a latch member mounted on said shaft for relative longitudinal movement along said shaft and relative rotational movement coaxially with said rotational axis, said latch member and said shaft being relatively moveable between a disengaged position in which said shaft is free to rotate relative to said latch member and an engaged position in which rotation between said shaft and said larch member is resisted by engagement between said latch member and a projection extending radially from said shaft; and
   a coupling that operatively couples said latch member with said track member, said coupling, in use, being operable to move said latch member between an engaged and a disengaged position by movement of said shaft in a direction transverse to said rotational axis.

2. A latch mechanism, as claimed in claim 1, wherein said coupling, in use, is operable to move said latch member between an engaged and a disengaged position by movement of said shaft in a direction orthogonal to said rotational axis.

3. A latch mechanism, as claimed in claim 1, wherein the latch mechanism is incorporated in a body of said electronic device.

4. A latch mechanism, as claimed in claim 1, wherein the latch mechanism is incorporated in a flip cover of said electronic device.

5. A latch mechanism, as claimed in claim 1, wherein the track member comprises a housing securable to said flip cover or said body.

6. A latch mechanism, as claimed in claim 1, wherein said shaft includes at least two spaced rollers fixed to said shaft for rotation therewith, said rollers each being located in a respective track on opposite sides of said track member.

7. A latch mechanism, as claimed in claim 6, wherein the track member includes a detent mechanism adjacent opposite ends of respective slotted apertures.

8. A latch mechanism, as claimed in claim 7, wherein the detent mechanism includes resiliently deformable gripping elements to releasably retain a respective roller.

9. A latch mechanism, as claimed in claim 6, wherein said latch member is restrained against rotation about said shaft by slidable engagement between said latch member and a wall of said track member.

10. A latch mechanism, as claimed in claim 1, wherein the coupling comprises a projection engaged with the track member whereby relative movement between a ramped surface of the track member and said projection along a length of the ramped surface in the direction transverse to said rotational axis urges said larch member between an engaged and a disengaged position.

11. A latch mechanism, as claimed in claim 10, wherein the ramped surface comprises a contoured slotted aperture in a transverse wall of said track member, said slotted aperture locating the projection that depends from said latch member.

12. A hand held electronic device having a flip cover movable between a latched closed position and an open position, said flip cover being slidable in a closed position alone a sliding axis between a latched position and an unlatched position whereby in said unlatched position, said flip cover is rotatable between a closed position and an open position about a rotational axis transverse to said sliding axis, wherein said device has a latch mechanism providing a latching of the flip cover when in the latched closed position, the latch mechanism including:
   a rotatable shaft, rotatable about said rotational axis, mounted in spaced slotted apertures of a track member to allow movement or said shaft in a direction transverse to said rotational axis;
   a latch member mounted on said shaft for relative longitudinal movement along said shaft and relative rotational movement coaxially with said rotational axis, said latch member and said shaft being relatively moveable between a disengaged position in which said shaft is free to rotate relative to said latch member and an engaged position in which rotation between said shaft and said latch member is resisted by engagement between said latch member and a projection extending radially from said shaft; and
   a coupling that operatively couples said latch member with said track member, said coupling, in use, being operable to move said latch member between an engaged and a disengaged position by movement of said shaft in a direction along said sliding axis.

13. A hand held electronic device, as claimed in claim 12, wherein the shaft includes at least two spaced rollers fixed to said shaft for rotation therewith, said rollers each being located in a respective track on opposite sides of said track member.

14. A hand held electronic device, as claimed in claim 12, wherein the track member includes a detent mechanism adjacent opposite ends of respective slotted apertures.

15. A hand held electronic device, as claimed in claim 14, wherein the detent mechanism includes resiliently deformable gripping elements to releasably retain a respective rallier.

16. A hand held electronic device, as claimed in claim 15, wherein said latch member is restrained against rotation about said shaft by slidable engagement between said latch member and a wall of said track member.

17. A hand held electronic device, as claimed in claim 12, wherein the coupling comprises a projection engaged with the track member whereby relative movement between a ramped surface of the track member and said projection along a length of the ramped surface in the direction transverse to said rotational axis urges said latch member between an engaged and a disengaged position.

18. A hand held electronic device, as claimed in claim 17, wherein the ramped surface comprises a contoured slotted aperture in a transverse wall of said track member, said slotted aperture locating the projection that depends from said latch member.

* * * * *

UNITED STATES PATENT AND TRADEMARK OFFICE
CERTIFICATE OF CORRECTION

PATENT NO. : 7,003,333 B2
DATED : February 21, 2006
INVENTOR(S) : Chow et al.

It is certified that error appears in the above-identified patent and that said Letters Patent is hereby corrected as shown below:

<u>Column 7,</u>
Line 48, delete "larch" and replace with -- latch --.

<u>Column 8,</u>
Line 24, delete "larch" and replace with -- latch --.
Line 33, delete "alone" and replace with -- along --.
Line 43, delete "or" and replace with -- of --.

Signed and Sealed this

Thirteenth Day of June, 2006

JON W. DUDAS
*Director of the United States Patent and Trademark Office*